(12) United States Patent
Mamut et al.

(10) Patent No.: US 11,109,196 B1
(45) Date of Patent: Aug. 31, 2021

(54) AUTOMATIC FORMATION OF SOCIAL NETWORKING GROUP BASED ON THREAD

(71) Applicant: Nextdoor, Inc., San Francisco, CA (US)

(72) Inventors: Tatyana Mamut, San Francisco, CA (US); Paul Howe, Mill Valley, CA (US)

(73) Assignee: NEXTDOOR, INC., San Francisco, CA (US)

( * ) Notice: Subject to any disclaimer, the term of this patent is extended or adjusted under 35 U.S.C. 154(b) by 56 days.

(21) Appl. No.: 16/784,593

(22) Filed: Feb. 7, 2020

(51) Int. Cl.
*H04W 4/08* (2009.01)
*H04L 12/58* (2006.01)
*H04W 4/029* (2018.01)
*H04L 29/08* (2006.01)
*G06Q 50/00* (2012.01)

(52) U.S. Cl.
CPC .............. *H04W 4/08* (2013.01); *G06Q 50/01* (2013.01); *H04L 51/12* (2013.01); *H04L 51/16* (2013.01); *H04L 51/20* (2013.01); *H04L 67/306* (2013.01); *H04W 4/029* (2018.02)

(58) Field of Classification Search
CPC ......... H04W 4/08; H04W 4/029; H04W 4/60; G06Q 50/01; H04L 51/12; H04L 51/20; H04L 51/16; H04L 67/306; H04L 51/32; H04L 51/046; H04L 51/10; H04M 2201/40; H04M 2201/60; H04M 3/4936
USPC ....................................................... 455/519
See application file for complete search history.

(56) References Cited

U.S. PATENT DOCUMENTS

| | | |
|---|---|---|
| 8,769,393 B1 | 7/2014 | Abhyanker |
| 8,775,328 B1 | 7/2014 | Abhyanker |
| 2008/0306754 A1 | 12/2008 | Abhyanker |
| 2009/0024740 A1 | 1/2009 | Abhyanker |
| 2009/0070435 A1 | 3/2009 | Abhyanker |
| 2014/0087780 A1 | 3/2014 | Abhyanker et al. |
| 2014/0136328 A1 | 5/2014 | Abhyanker |
| 2014/0143028 A1* | 5/2014 | Howe ............... G06Q 50/01 705/12 |
| 2014/0188880 A1 | 7/2014 | Abhyanker |
| 2014/0230030 A1 | 8/2014 | Abhyanker |
| 2014/0236732 A1 | 8/2014 | Abhyanker |
| 2014/0237051 A1 | 8/2014 | Abhyanker |
| 2014/0317696 A1 | 10/2014 | Abhyanker |

* cited by examiner

*Primary Examiner* — Shaima Q Aminzay
(74) *Attorney, Agent, or Firm* — Hickman Becker Bingham Ledesma LLP; Malgorzata A. Kulczycka

(57) ABSTRACT

A method and apparatus for creation and storage of online community groups is provided. In various implementations, digital communication data is stored representing interactions between users as part of an online community platform. In various implementations, a user of the online community platform indicates the desire to create a group comprising digital accounts which have interacted with the user as indicated by the digital communication data. In various implementations, a digital communication group is created comprising digital accounts specifically chosen by a user of an online community platform.

20 Claims, 8 Drawing Sheets

300 310

A. Zhao, Liberty Heights

Dog walking areas near Downtown? Need recommendations.

30 Aug   Animals and Pets

☺ THANK    ↳ REPLY    ❀ START GROUP   — 320

SEE PREVIOUS REPLIES                              ☺ 2    ↳ 3

T. McClure, Liberty Heights                           54 mins ago

@A. Zhaou, we often take our dogs for walks at Church Key park and love it there! ▽

J. Schomer, Plaza District                            32 mins ago

@T. Castle and I started walking our dogs in the next park over, is it that good?! ▽

T. Castle, Plaza District                             26 mins ago

We've actually been looking for other dog owners to help socialize while we walk! ▽

FIG. 3

Create Social Group:

Group Name: Dog Walkers of Liberty Heights

Description: A group for those with dogs who walk outdoors in the Liberty Heights area. All those with dogs or who walk regularly are welcome.

Location: Liberty Heights

| Replies | ☺ | ☹ | Direct Replies |
|---|---|---|---|
| ☑ | T. McClure, | | Liberty Heights |
| ☑ | J. Schomer, | | Plaza District |
| ☐ | T. Castle, | | Plaza District |

Create Social Group

FIG. 7

AUTOMATIC FORMATION OF SOCIAL NETWORKING GROUP BASED ON THREAD

FIELD OF THE DISCLOSURE

One technical field of the present disclosure is online community and electronic networking. Another technical field is grouping online community profiles in privatized groups based on profile interactions. Another technical field is creating specialized online community pages for specific online community users.

BACKGROUND

Online communities and digital networking are rapidly growing and increasingly complex fields. Connectivity rates between digital groups continue to increase at exponential paces as more users consume and interact with personal and public internet profiles, pages, offers, and many other internet mediums on a daily basis. Social networking and social media as examples of online communities, in particular, have permitted interconnectivity in ways previously thought impossible. Profile and page based online community platforms allow users to interact with a near infinite variety of acquaintances, strangers, businesses, peers, co-workers, neighbors and other entities.

One particularly useful feature of online communities is the connection and sharing of information between users and entities with similar interests, hobbies, life activities, questions, concerns and other congruencies. Traditional online communities uses publicly available messaging boards and peer-to-peer messaging mediums to convey information quickly and interactively. Users utilize these tools to perform a variety of digital actions, such as soliciting information, expressing concerns, informing neighbors, or simply chatting with other users.

Contemporary public communication mediums of online communities are useful for providing a publicly accessible medium through which users may express thoughts and emotions, argue topics, exchange information, and generally interact with the public.

Online community platforms have attempted to overcome these issues by allowing a user to "blacklists" their public communication by specifically selecting individual digital accounts that cannot view their public communications. Such actions may cause users to forget to exclude certain profiles, leaving their communications vulnerable to the general public. Such systems are effective are at keeping grouping select users from viewing certain information but requires a massive strain on users, who must meticulously specify each individual or group manually that can or cannot see public online community posts. Users have undoubtedly found that creating an extensive blacklist on online communities is an exhausting task when millions of profiles which can view public communications exist.

Users may attempt to overcome these problems by creating private group pages which "whitelist" a certain group of users which can exclusively post and communicate within the group page. A user who creates a private group page and selects individual profiles that can view their private communications must scrupulously flag each whitelisted user. As a result, some user profiles may be incorrectly excluded from the group, causing important information to be missed by the user. When attempting to create group pages, accidental manual exclusion causes a group page to be too tightly restricted to live up to its purpose of soliciting the most relevant opinions and information from knowledgeable users.

BRIEF DESCRIPTION OF THE DRAWINGS

In the drawings:

FIG. 3 illustrates an example graphical user interface comprising an example online community post according to an implementation.

FIG. 7 illustrates an example graphical user interface comprising an example online community post according to an implementation.

DETAILED DESCRIPTION

1. General Overview

Figure 1:
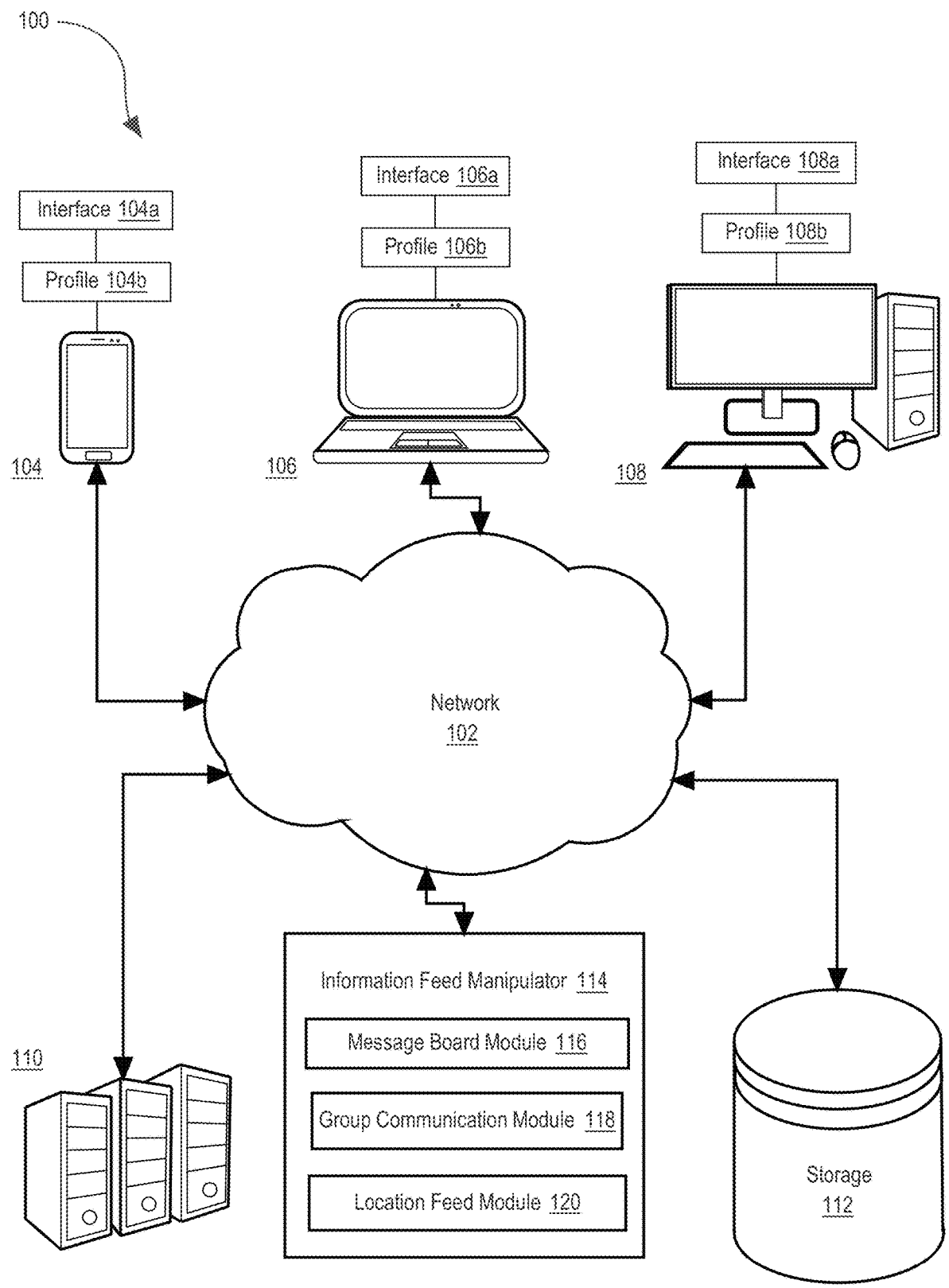
FIG. 1 illustrates an example networked computer system with which various implementations may be practiced.

In various implementations, a computer-implemented method facilitates the creation of a private group page on an online community platform using stored information from previous conversations or interactions between users. The group page may comprise one or more users, including an group administrator who has indicated to a digital online community system that the private group be created. The group may also comprise additional users in any amount and the additional members may be taken from a list of user profiles which have interacted directly or indirectly with the group administrator. A "group page" as described herein may mean a digital communication group through which member digital accounts may interact and communicate and may be an access-restricted web-page or other digital entity.

The computer-implemented method may be utilized to store, in an online community system via a digital computing device, digital communication data representing a first digital conversation comprising online community posts of two or more digital accounts. The first digital conversation may be any interaction between two or more digital accounts. The data may be stored in such a way that a user may access current or previous digital conversations between the user and at least one other profile.

The computer-implemented method may be utilized to receive, at the digital computing device, from a first computing device associated with a first digital account of the one or more digital accounts, a request to generate a digital communication group, the digital communication group comprising a second digital conversation. The indication from the first computing device may be any kind of indication or behavior capable of signaling the digital computing device to create data in a system representing a group page on the online community platform.

The computer-implemented method may be utilized to determine, by the digital computing device, a first subset of the two or more digital accounts to associate with the digital communication group based on the online community posts. The first subset of the two or more digital accounts may be any number of digital accounts taken from the two or more digital accounts in any combination. The first subset may be selected in some fashion to optimize the membership of the group page according to the needs of the online community platform or the desires of an administrative user.

The computer-implemented method may be utilized to create and store the digital communication group in association with a name of the digital communication group and account identifiers of each of the digital accounts in the first subset. The digital communication group may be stored in any fashion necessary to create and maintain the group page for access to the page on the online community platform. Account identifiers may be used to associate certain digital accounts with the group page to alter the manner in which select users may view and interact with the group page.

The computer-implemented method may be utilized to provide by the digital computing device, access to the digital communication group and the second digital conversation, only to the particular digital accounts in the first subset of the one or more digital accounts. The digital computer system may use any means necessary to include the digital accounts with the digital communication group, including via notification invite, authentication, or automatic inclusion in the group. Only digital accounts associated with the group page may be granted access in this case.

Utilizing of computer-implemented method of group page creation and association based on stored interaction data allows for safer, more convenient and more efficient group facilitation on a online community platform. A user wishing to create a group page to enable communication and information sharing may designate a previous interaction with a second user as the basis for the creation of the group. Accordingly, at least that second user with whom the user has interacted with will be added to the group. This eliminates the tedious process of manual group creation and user whitelisting which is highly prone to human error. The group page may be created when more than one interacting user with who the administrative user has interacted is selected from a digital conversation. As groups of interacting users become larger and more diversified, this method of group page creation far outpaces the limited abilities of manual group creation and whitelisting.

Technical improvements are also created with this computer-implemented method. Each time a group page is created on an online community platform, copious data must be stored at storage servers operating the social networks digital functions. Large portions of server data are occupied with inefficiently created and maintained groups. As a result, multiple group pages may exist between a network of users which comprise the same information. By creating group pages from interactions with two or more users, server space and processing power is saved by consolidating group data on as little server space as possible. The creation of groups also slows server processes and storage by requiring bandwidth be allocated as a user creates and whitelists users in a group. By creating a group from previously stored interactions, group pages can be instantiated in far less time than usual, saving processing power and server storage.

2. Example Computing Environments and Computer Components

FIG. 1 illustrates an example networked computer system with which various implementations may be practiced. FIG. 1 is shown in simplified, schematic format for purposes of illustrating a clear example and other implementations may include more, fewer, or different elements. System 100 comprises various entities and devices which may be used to practice an implementation. Network 102 is a network entity which facilitates communication between entities depicted in FIG. 1. Connection to network 102 is show by double-sided arrows between a connecting entity and network 102. Network 102 may be any electronic communication medium or hub which facilitates communications between two or more entities, including but no limited to an internet, an intranet, a local area connection, a cloud-based connection, a wireless connection, a radio connection, a physical electronic bus, or any other medium over which digital and electronic information may be sent and received.

Information feed manipulator 114 is connected to network 102, and is an entity which allows the parsing and recognition of data entering and leaving a social network platform. Information feed manipulator 114 may be any hardware, software, virtual machine, or general-purpose entity capable of performing the processes discussed herein. In various implementations, information feed manipulator 114 is a software program integrated into an online community platform being facilitated from the digital computing device or device network. In various implementations, information feed manipulator 114 is a module integrated into an online community system capable of manipulating digital communications and digital communication groups as discussed herein.

Information feed manipulator 114 comprises message board module 116. Message board filter 116 may be a module which parses and stores information related to digital communications and digital communication mediums facilitated by an online community platform. For example, message board filter 116 may have access to digital communications stored and accessible on an online community platform. In various implementations, message board filter stores data and metadata relating to digital communications and interactions between users. In various implementations, information feed manipulator 114 receives interaction metadata between two or more users from message board module 116 to determine the nature of interaction between two or more uses.

Information feed manipulator 114 comprises group communication module 118. Group communication module 118 may be a module which parses and stores information related to group pages and private chat rooms comprising one or more users. For example, group communication module may store and provide access to a number of digital communication groups which include one or more digital account for private interaction. In various implementations, group communication module 118 store information relating to group pages including metadata specifying one or more account identifiers representing accounts which may access and interact with a group page. In various implementations, information feed manipulator 114 receives group data from group communication module 118 in order to determine a number of existing group pages. In a further implementation, information feed manipulator 114 communicates with group communication module 118 to store information corresponding to a new group page, the data including metadata relating to interaction metadata specified by message board module 116.

Information feed manipulator 114 comprises location feed module 120. Location feed module 120 is a module which parses and stores information related to the particular geographical location of a user or a digital user profile. For example, location feed module may store geolocation data corresponding to a physical location of a user or digital account. The location may be a real-time location or a fixed location defined by an online community platform or the user manually. In various implementations, location feed module 120 stores metadata corresponding to a geolocation of a user profile which is sharable to entities within an online community platform. In various implementations, information feed manipulator 114 receives geolocation metadata from location feed module 120 in order to determine that a user is within a particular geolocation. In a further implementation, information feed manipulator 114 uses metadata from location feed module 120 to determine that a group page created and stored in group communication module 118 comprises at least two users having interactions corresponding to metadata from message board module 114, and that the at least two users are in a similar geographical area.

Devices 104-108 are user account devices/entities which allow individual users to interact with an online community platform through network 102. Devices 104-108 may be any devices capable of connection to network 102 through any method described herein. Devices 104-108 may comprise various programs, modules, or software, including a profile module 104b-108b and an interface module 104a-108a. In various implementations, devices 104 utilize profile module 104b-108b to maintain and interact with an online community platform via a user-based digital account. The digital account represents membership in the online community platform and allows the user to interact with the online community platform through the profile modules 104b-108b on devices 104-108. The interaction between the online community platform may be facilitates by a user interface generated and maintained by interface modules 104a-108a which receive user input at devices 104-108 and convert the input to contextual digital actions on the online community platform.

Any device which may connect to network 102 to access an online community platform may be one of devices 104-108 and any number of devices may be used, including a smaller or larger number of devices than those depicted in FIG. 1. For example, FIG. 1 depicts a mobile device 104 which comprises a profile module 104b and an interface module 104a to connect and interact with an online community platform. A mobile computing device 106 having a profile module 106b and an interface module 106a is also shown, as is a hard-wired computing device 108 comprising a profile module 108b and an interface module 108a. Each device may use a device specific version of a profile module 104b-108b and/or an interface module 104a-108a. A user may facilitate digital account interactions for an online community platform by interacting the device.

Server 110 may be any number of individual or linked servers which facilitate the exchange of digital information related to the creation of group pages on an online community platform. For example, server 110 may store data relating to a backend framework for an online community platform which is accessible to any of devices 104-108. In various implementations, a backend framework represented by stored data in server 110 is accessible to information feed manipulator 114 in order to allow the creation of and interaction with group pages on an online community platform.

Storage 112 may be any number of individual or linked storage devices or mediums which allow the storage of digital data related to the creation of group pages on an online community platform. For example, storage 112 may store data relating to digital user profiles for use in an online community platform. In various implementations, devices 104-108 utilize profile modules 104b-108b to share information with storage 112 to manipulate data relating to digital user profiles corresponding to users of those devices. In various implementations, information feed manipulator 114, server 110 and storage 112 communicate over network 102 to provide, to devices 104-108, an online community platform comprising a backend environment populated with user profiles interacting through various communication mediums. In various implementations, system 100 is designed to execute process 200 described below.

3. Example Processes

Figure 2:
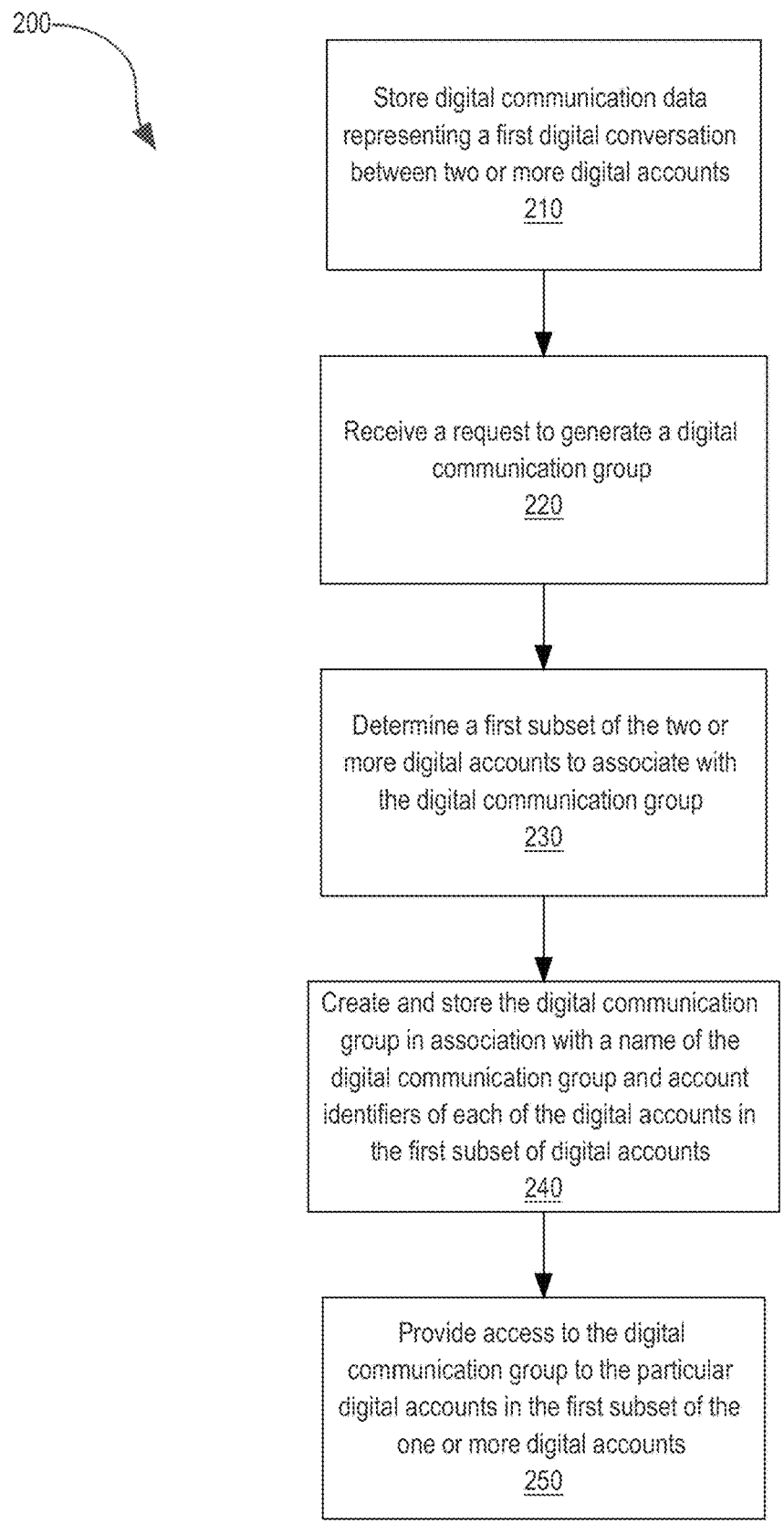
FIG. 2 illustrates a creation process for a digital communication group according to various implementations.

The example process 200 depicted in FIG. 2 starts by storing digital communication data representing a first digital conversation between two or more digital accounts. A request is received to generate a digital communication group based on the stored digital communication data. A first subset of the two or more digital accounts to associated with the digital communication group is determined. The process then causes creation and storing of the digital communication group in association with a name of the digital communication group and account identifiers of each of the digital accounts in the first subset of digital accounts. Access is then provided to the digital communication group only for particular digital accounts in the first subset of the one or more digital accounts.

Returning to the beginning of the process depicted in FIG. 2, the process begins at step 210 by storing digital communication data representing a first digital conversation between two or more digital accounts. The digital communication data may be stored by any entity capable of storing digital communication data, including a digital computing device and/or digital storage medium. In various implementations, the data is stored in a computing module or external storage, such as message board module 116 or storage 112, respectively. The digital communication data may be stored as part of an online community system or online community platform available to a plurality of users associated with digital user profiles or accounts.

In various implementations, the digital communication data stored represents a digital conversation between the two or more digital accounts facilitated by the online community system, such as a digital messaging board. For example, the digital communication data may represent a present or past conversation facilitated by the online community system as a message board over which the two or more digital accounts engage in a conversation through standard text string exchange. In various implementations, message board module 116 or a similar entity stores metadata associated with the digital communication specifying that the two or more digital accounts have interacted through the digital communication. In various further implementations, a network map or diagram is generated and stored according to the associations specified by the digital communication data or metadata to track a "web" of interactions between users. In various further implementations, the web is further based on similar traits between the interacting users, such as geographical location, familial relationships, common interests, common membership in a group or any other mutual trait between two users.

At step 220, a request to generate a digital communication group is received. The request to generate the digital communication group may be received from a first computing device associated with a first digital account of the two or more digital accounts, such as any of devices 104-108. In various implementations, the digital communication group is a private group page in which digital accounts may or may not have a membership, the membership associated with an ability to view and interact with digital communications within the group page. In various further implementations, the private group page comprises a second digital conversation such as a message board, the message board only accessible to users of digital accounts associated with the private group page.

In various implementations, the request to creation the digital communication group is facilitated by a user interface at a device, such as those interfaces generated at interface modules 104a-108a. The request may be created and sent via a digital process whereby a device and interface interpret contextual user interactions with a device to represent a desire to create the digital communication group. In various implementations, the contextual user interaction may be limited to interactions which occur with online community platform elements associated with at least two or more users. For example, in various implementations, a user may only request to create a digital communication group by interacting with an online community entity which itself has been interacted with by a least one additional distinct user. In various further implementations, an interface presented to a user shows all digital communications associated with interactions between two or more users as comprising a request icon which can be manually interacted with to request a digital communication group be created between at least the two interacting users.

At step 230, a first subset of the two or more digital accounts to associate with the digital communication group is determined. The first subset may be based, at least in part, on digital communications between the two or more users and their interactions with the communication. In various implementations, the digital communication is a "posting" on an online community platform, which may be a message board with which users including users associated with the two or more digital accounts may interact. In various implementations, the first subset of the two or more digital accounts is a less inclusive subset of the two or more digital accounts. For example, if at least three users have interacted with a posting on an online community platform, the first subset may include only two digital accounts associated with two users and exclude at least one digital account associated with another user.

In various implementations, the first subset is determined with a combination of interaction metadata and input from a user. For example, a user may request the creation of a digital communication group and the digital communication group may be associated with any of three or more interacting digital accounts. The user may then further specify that at least one profile of the three or more interacting profiles is not to be included in the digital communication group, resulting in a first subset of three or more digital accounts which excludes the at least one profile specified. In various implementations, a system automatically selects a first subset of the two or more digital accounts to include in the digital communication group based on some criteria. In various further implementations, the criteria may be a geographic location, mutual data between the digital profiles and/or a confidence metric which represents the likelihood that a particular account is likely to belong to a digital communication group. For example, an entity facilitating digital group creation such as information feed manipulator 114 may determine the first subset based on geographic data obtained from location feed module 120 in order to allow only certain digital accounts in a geographic subset to access a digital communication group based on the digital account's relative geography. In various further implementations, the geographic subset may be constrained to a threshold boundary which sets limits on a geographic location from which a digital account may be included in the first subset.

At step 240, the digital communication group is created and stored in association with a name of the digital communication group and account identifiers of each of the digital accounts in the first subset of digital accounts. The creation of the digital communication group may be performed automatically in response to completion of the above steps. In various implementations, the creation of the digital communication group may be performed in response to the meeting of one or more additional criteria. For example, in an implementation, the online community platform may send electronic "invitations" to the first subset of digital accounts. The digital communication group may then be created only once each member of the first subset of user accounts accepts the electronic invitation.

In various implementations, the created group is stored in an electronic storage or entity storage medium such as storage 112 or group communication module 118 respectively. Storing the data relating to the digital communication group may comprise storing additional data or separate metadata related to one or more account unique account identifiers. The one or more unique account identifiers may be identifiers which correspond to one or more unique digital accounts which are associated with the digital communication group. In various implementations, only digital accounts corresponding to digital identifiers stored may access and interact with the online community platform through the digital communication group. In various further implementations, a corresponding identifier of a digital account is searched for in memory before the digital account is allowed access to the digital communication group. The digital identifiers may be associated or disassociated with the digital communication group in various ways, effectively granting or revoking access for a digital account at any time.

At step 250, access to the digital communication group is provided only to those digital accounts in the first subset of the one or more digital accounts.

4. Example Environments

FIG. 3 illustrates an example graphical user interface comprising an example online community post according to an implementation. Specifically, FIG. 3 depicts an online community platform interface such as those created by interface modules 104a-108a. The interface depicted in FIG. 3 may comprise a background medium 300 upon which online community data such as digital communications may be created and viewed. In various implementations, the background medium 300 is a continuous background or medium upon which any number of digital conversations or posts may be viewed and interacted with. For example, background medium 300 may exist on a digital webpage viewable on a dynamic screen at any of devices 104-108. Different part of the digital webpage may be viewed by manually interacting with the digital webpage at the device. For example, as depicted in FIG. 3, the digital medium has no upper of lower boundary and a user may scroll up and down in the digital webpage to view postings or digital conversations overlapping different portions of the background medium 300 than are shown in FIG. 3.

Network post 310 may be a network communication which is publicly viewable and interactive as part of background medium 300. Network post 310 may be a digital communication as represented on a graphical user interface by interpreting stored digital data relating to a social network post. Various parts of network post 310 are viewable in FIG. 3. For example, network post 310 comprises a name, a portrait, and a location of a user who created the digital communication, shown in FIG. 3 as the pseudonym "A. ZHAO." In various implementations, pseudonyms, portraits, and geographic areas may be associated with a digital account accessing the online community platform. As depicted in FIG. 3, the digital account registered to "A. ZHAO" has created a digital communication soliciting public feedback on recommendations for areas to walk a pet dog. The digital communication comprises various representative information, including a picture photograph of a park, a geographic representation of a nearby area, a date of the posting and a tag relating to the subject of the digital communication.

In various implementations, other digital accounts may interact with network post 310. For example, digital accounts may post text-based messages on network post 310 to interact with A. ZHAO and other digital accounts through the online community post. As depicted in FIG. 3, digital users "T. MCCLURE" and "J. SCHOMER" have interacted with A. ZHAO's network post 310 through digital text-based replies. User "T. CASTLE" has further interacted with J. SCHOMER'S post. In various implementations, characteristics of the interactions between users is shown in a digital communication. For example, in each reply, the location of the respondent, a portrait, a time the reply was made, and the text created by the user comprise user replies in FIG. 3.

User's may interact with a digital communication such as network post 310 in way other than text-based messaging as well. Network post 310 or other facets of a user interface implementing an online community platform may include user-interactable elements that modify or adapt to the way in which a user interacts with a digital post or page. One example may be the interaction of a digital user with clickable buttons on an interface which allow the user to interact with one or more posts on the digital communication platform. For example, network post 310 is shown comprising several interactive buttons labeled "THANK," "REPLY," AND "START GROUP." In various implementations, when a user interacts with the REPLY button, they may create a text-based reply as discussed above. In various implementations, when a user interacts with the THANK button, they may leave an indication of symbolic appreciation attached to the post. Any indication of emotion or reaction to a post may be left by interacting with a button, and any button may be used in conjunction with a digital communication. For example, a user may interact with another button which leaves an indication of dissatisfaction with a post in the alternative if such an option exists. A number of symbols or replies associated with a post by a indicated as shown in FIG. 3.

In various implementations, selection of a button or some other interaction with the interface of the online community platform may cause the initiation of a digital communication group creation process such as process 200 outlined in FIG. 2. For example, a user may interact with network post 310 by utilize the START GROUP button 320 to begin the group creation process by interacting with the START GROUP button 320 on an interface at any of devices 104-108. In various implementations, data or metadata associated with network post 310 may be utilized in creating the digital communication group once START GROUP button 320 has been pressed. For example, according to process 2, at least four users utilizing four digital accounts have interacted with the digital conversation network post 310, A. ZHAO, T. MCCLURE, J. SCHOMER, AND T. CASTLE. Other distinct users who have "THANKED" A. ZHAO for the post may also be included among the digital accounts. These digital accounts may be used in the determination of the first subset of digital accounts to associate with the newly created digital communication group. In various implementations, selection of the START GROUP button 320 may redirect an interacting user to a separate network post or group creation webpage to provide additional information input.

Figure 4:
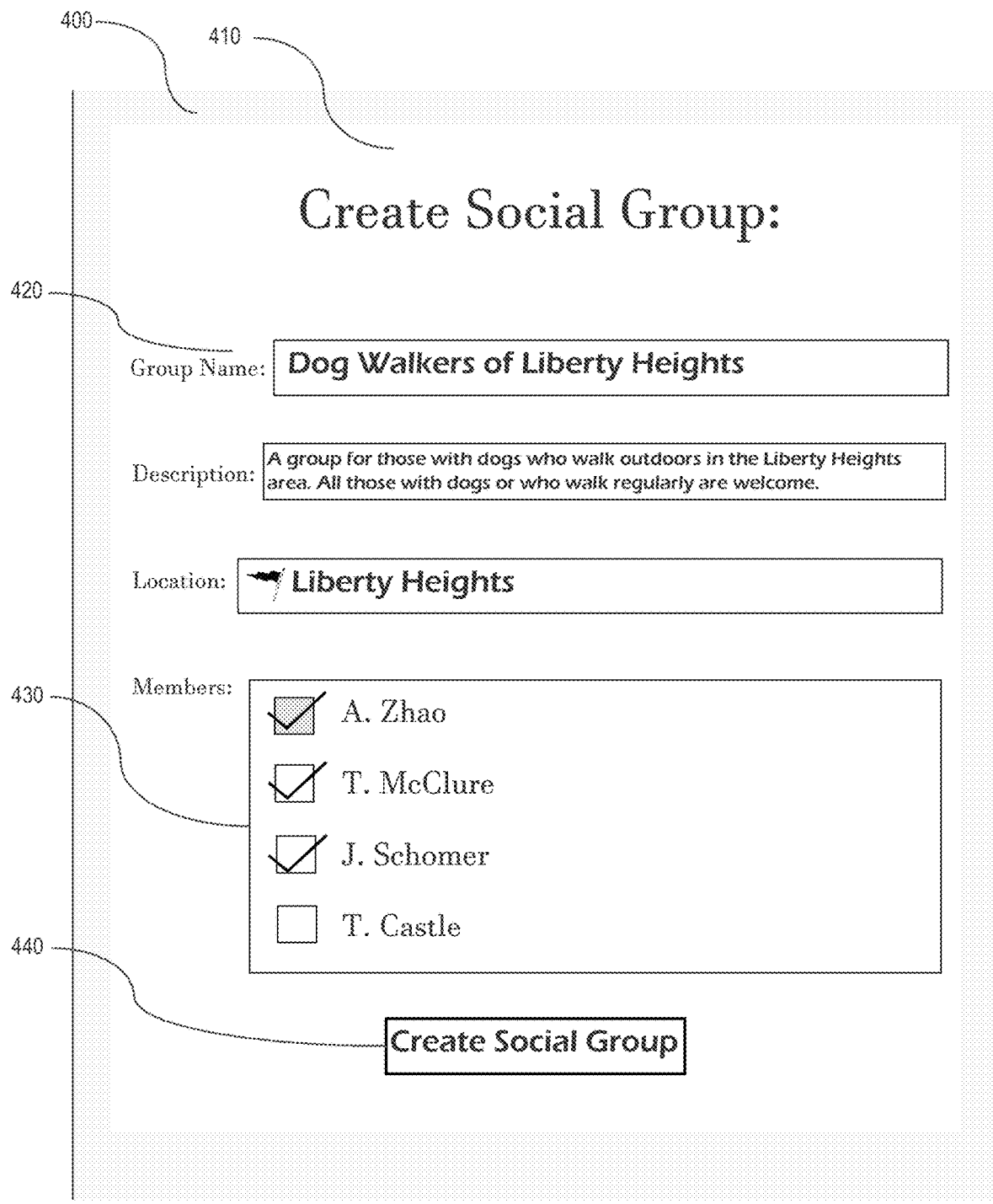
FIG. 4 illustrates an example graphical user interface comprising an example online community post according to an implementation.

FIG. 4 illustrates an example graphical user interface comprising an example online community post according to an implementation. Specifically, FIG. 4 depicts an online community platform interface such as those created by interfaces 104a-108a. The interface depicted in FIG. 4 may comprise a background medium 400 upon which online community data such as group page creation data may be created and viewed. The background medium 400 may be similar to background medium 300 or different. Digital group creation page 410 may be a network page which is publicly viewable and interactive as part of background medium 400. In various implementations, the user interacting with START BUTTON 520 is redirected to digital group creation page 410. Digital group creation page may comprise one or more fillable data fields, such as name field input 420.

Name field 420 may be a field which accepts user input to create and store data which will be associated with a group page. For example, name field 420 accepts user input comprising a text-based format to provide a name to the digital communication group to be created. Additional examples of a fillable text field may include descriptions fields, such as the description field depicted in FIG. 4. In various implementations, other fields may be automatically or manually filled with non-text-based input. For example, the location field depicted in FIG. 4 may be automatically populated with the creating user's inherent geographic location data or a location of the user's choice.

Member checklist 430 may be an interactive checklist which a user such as a group administrator may utilize to specify a specific subset of users to be included in a group page. In various implementations, the first subset of digital accounts to be associated with the digital communication group is taken from a subset of users specified by member checklist 440. For example, a manual checkbox may be used to select or deselect users who have interacted with the original digital communication to create the first subset of digital accounts. As depicted in FIG. 4, A. ZHAO is automatically filled in, signifying A. ZHAO is the creator of the digital communication group and will be automatically included in the first subset. T. MCCLURE AND J. SCHOMER are represented by boxes with checks, indicating that A. ZHAO has included both digital accounts to be associated with the digital communication group. User T. CASTLE is represented by a box with no check, indicating that A. ZHAO has not included T. CASTLE's digital account for association with the digital communication group. Group creation button 440 may be an interactive digital button which will facilitate the creation of a group page. In various implementations, once group creation button 440 is pressed through user interaction, the selected users in membership checklist 430 will be associated with the newly created digital group.

Figure 5:
FIG. 5 illustrates an example graphical user interface comprising an example online community post according to an implementation.

FIG. 5 illustrates an example graphical user interface comprising an example online community post according to an implementation. Specifically, FIG. 5 depicts an online community platform interface such as those created by interfaces 104a-108a. User menu 500 may be an interactive menu which displays information related to a user who has interacted with another digital account on an online community platform. For example, FIG. 5 depicts a network post similar to network post 310. In the instance of the network post depicted in FIG. 5, a user has selected a tabular icon next to the reply made by T. MCCLURE. As a result, user menu 500 has been instantiated on the graphical user interface. User menu 500 comprises group creation tab 510. Group creation tab 510 may be an interactive tab within user menu 500 which is selectable by a user to create a group page comprising the user and the interacting profile. In various implementations, selecting group creation tab 510 from user menu 500 may cause the creation of a digital communication group comprising at least a first subset of the selecting user and the user to whom user 500 corresponds. In various implementations, selecting group creation tab 510 from user menu 500 may cause the creation of a digital communication group comprising a first subset of only the selecting user and the user to whom user 500 corresponds.

Figure 6:
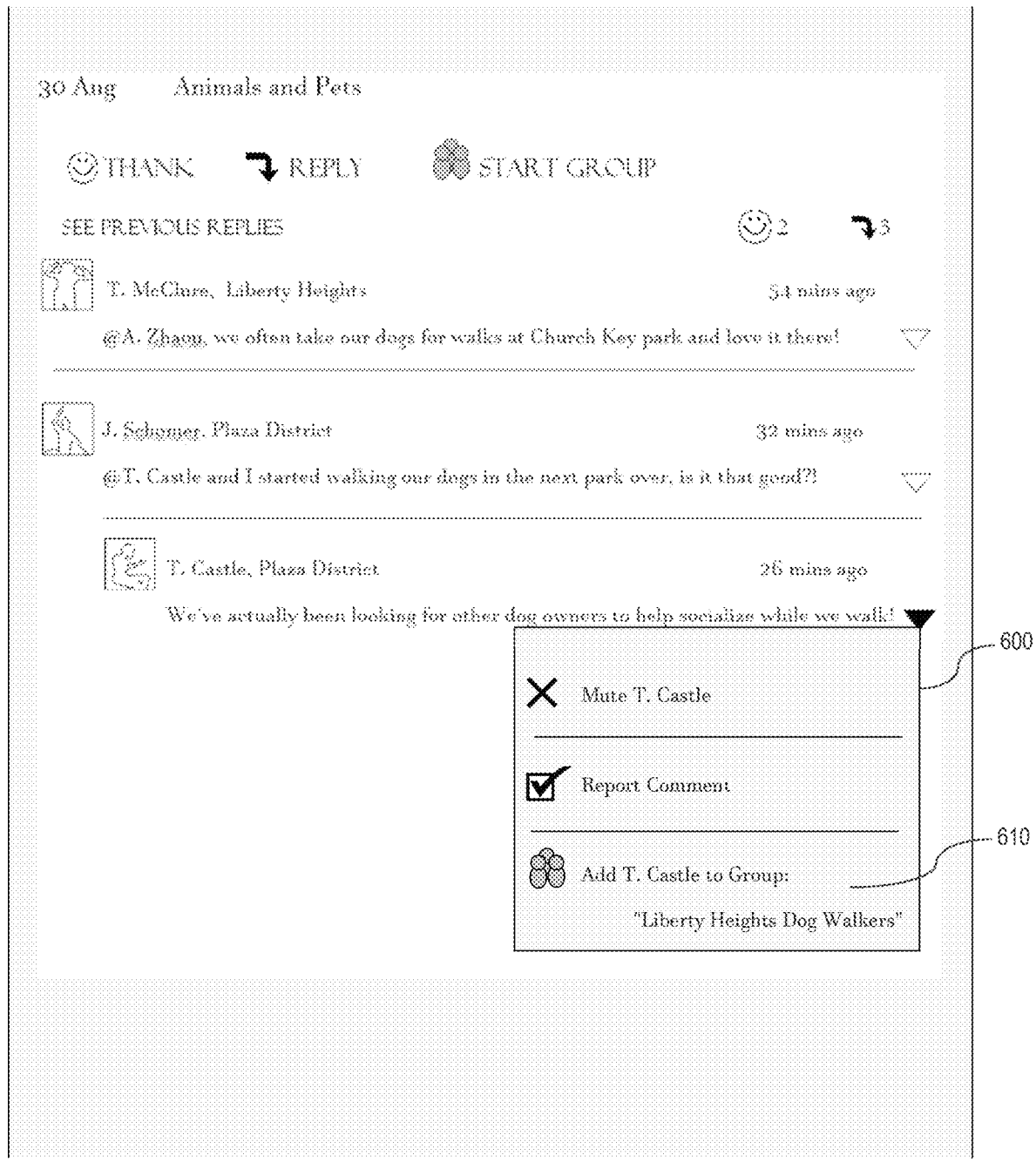
FIG. 6 illustrates an example graphical user interface comprising an example online community post according to an implementation.

FIG. 6 illustrates an example graphical user interface comprising an example online community post according to an implementation. Specifically, FIG. 6 depicts an online community platform interface such as those created by interfaces 104a-108a. User menu 600 may be an interactive menu which displays information related to a user who has interacted with another digital account on an online community platform and may be similar or different than user menu 500. Group addition tab 610 may be an interactive tab within user menu 600 which is selectable by a user to add a corresponding digital account to an existing group page comprising the user. As depicted in FIG. 6, group addition tab 610 may allow the addition of one or more digital accounts to the associated first subset of digital accounts in an existing group. For example, selecting group addition tab 610 may create an associated between the digital account representing user T. CASTLE and a previously created digital communication group.

FIG. 7 illustrates an example graphical user interface comprising an example online community post according to an implementation. Specifically, FIG. 7 depicts an online community platform interface such as those created by interfaces 104a-108a. The interface depicted in FIG. 7 may be similar to digital group creation page 410. Interaction checklist 700 may be an interactive portion of a group creation page which allows a user to specify subsets of interacting digital accounts to include in a new group page. Checklist interface 710 may change according to inputs by a user in order to choose which interacting profiles to include in the group page. For example, as depicted in FIG. 7 a user may select between various groups of interacting users, namely users that have replies to a digital communication, users who expressed symbolic appreciation for the digital communication, users who expressed symbolic distaste with the digital communication, and users who have directly replied to a post or a reply made by the creating user.

The tabs in interaction checklist 700 may be selected to bring up different checklists of corresponding users who have interacted with the digital communication in a fashion corresponding to the tab. For example, as depicted in FIG. 7, the REPLIES tab is selected, showing three digital profiles which have interacted with the digital communication by replying to it. In various implementations, all checkboxes are automatically filled in upon accessing a group creation page, and a creating user can manually uncheck boxes for digital accounts to be excluded from the digital communication group. In various implementations, no checkboxes are automatically filled in upon accessing the group creation page and the creating user can manually check boxes for digital accounts to be included in the digital communication group.

Figure 8:
FIG. 8 illustrates an example graphical user interface comprising an example online community post according to an implementation.

FIG. 8 illustrates an example graphical user interface comprising an example online community post according to an implementation. Specifically, FIG. 8 depicts an online community platform interface such as those created by interfaces 104a-108a. Digital communication group page 800 may be a digital page on an online community platform that has been created by any of the processes described above. For example, digital communication group page 800 has been created as a digital communication group page comprising information taken from filled fields. As depicted in FIG. 8, the group name, description and creating user, or "admin," are all included in the digital communication group page 800.

User recommendation field 810 may present visual recommendations of users to whom access to the group page may be offered. User recommendations may be based on any set of criteria of digital accounts and may include common data between the group, the digital accounts associated with the group, and/or the recommended digital accounts. For example, as depicted in FIG. 8, two users are recommended based on different criteria. User "A. PEARSON" may be recommended as a member of another group having a similar name and a similar geographic area to the digital communication group. User "T. KAMADO" may be recommended as an owner of a business having a title similar to the group name. In various implementations, the first subset of digital accounts may be further based upon exclusive membership in another digital communication group. Discussion board 820 may be a digital communication which is only accessible to digital accounts which are provided access to the digital communication group page 800. In various implementations, discussion board 820 may be a digital communication similar to those digital communications discussed herein, but accessible only to members of the digital communication group.

What is claimed is:

1. A computer-implemented method comprising:
in an online community system, storing, using a digital computing device, digital communication data representing a first digital conversation comprising online community posts of two or more digital accounts;
receiving, at the digital computing device, from a first computing device associated with a first digital account of one or more digital accounts, a request to generate a digital communication group;
determining, by the digital computing device, a first subset of the two or more digital accounts to associate with the digital communication group based on the online community posts;
creating and storing the digital communication group in association with a name of the digital communication group and account identifiers of each of the digital accounts in the first sub set;
providing, by the digital computing device, access to the digital communication group to a particular digital accounts in the first subset of the one or more digital accounts.

2. The computer-implemented method of claim 1, wherein the first digital conversation is a digital messaging board and the association between the one or more digital accounts and the first digital conversation comprises at least one interaction by each of the one or more digital accounts with the digital messaging board.

3. The computer-implemented method of claim 1, further comprising:
   receiving, by the digital computing device, data indicating an interaction between a second digital account and the first digital conversation;
   associating, by the digital computing device, the second digital account with the first digital conversation;
   determining, by the digital computing device, whether the second digital account will be included in the first subset of the one or more digital accounts.

4. The computer-implemented method of claim 1, further comprising:
   sending, to the first computing device associated with the first digital account, a list comprising the one or more digital accounts associated with the first digital conversation;
   selecting, at the first computing device associated with the first digital account, a subset of the one or more digital accounts from the list;
   wherein the first subset of the one or more digital accounts to associate with the digital communication group is based on the selected subset of the one or more digital accounts from the list.

5. The computer-implemented method of claim 1, wherein the digital communication group is an access-restricted web page, a second digital conversation is a digital messaging board, and providing access to the digital communication group and the second digital conversation, to one or more account devices associated with each digital account in the first subset of the one or more digital accounts comprises granting access to the one or more account devices to view the access-restricted web page and interact with the digital messaging board.

6. The computer-implemented method of claim 1, further comprising:
   determining, by the digital computing device, a second subset of the one or more digital accounts, the second subset containing one or more digital accounts which have interacted with the first digital account over the first digital conversation;
   wherein the first subset of the one or more digital accounts to associate with the digital communication group is based on the second subset of the one or more digital accounts.

7. The computer-implemented method of claim 1, wherein:
   each digital account of the one or more digital accounts is associated with a geographic area;
   the method further comprises determining, by the digital computing device, a geographic subset of the one or more digital accounts, the geographic subset comprising digital accounts associated with a geographic area within a threshold boundary centered on a first geographic area associated with the first digital account;
   the first subset of the one or more digital accounts to associate with the digital communication group is based on the geographic subset of the one or more digital accounts.

8. The computer-implemented method of claim 1, wherein:
   the association between the one or more digital accounts and the first digital conversation comprises a visual representation of one or more digital accounts' interactions with the first digital conversation;
   the method further comprises selecting, by the first computing device associated with the first digital account, through the visual representation, a second digital account to include in the digital communication group;
   the first subset of the one or more digital accounts to associate with the digital communication group comprises at least the first and second digital accounts.

9. The computer-implemented method of claim 1, wherein:
   the association between the one or more digital accounts and the first digital conversation comprises one or more digital accounts' interactions with the first digital conversation;
   the method further comprises determining a second subset of digital accounts of the one or more digital accounts which interacted with the first digital conversation in a first manner;
   the method further comprises determining a third subset of digital accounts of the one or more digital accounts which interacted with the first digital conversation in a second manner;
   the first subset of the one or more digital accounts to associate with the digital communication group comprises the second subset of the one or more digital accounts and does not comprise the third subset of the one or more digital accounts.

10. The computer-implemented method of claim 1, wherein providing, by the digital computing device, access to the digital communication group, to the particular digital accounts in the first subset of the one or more digital accounts, comprises providing access to the digital communication group only to the particular digital accounts in the first subset of the one or more digital accounts and no other digital accounts.

11. One or more non-transitory computer-readable media storing instructions which, when executed by one or more processors, cause:
   in an online community system, storing, using a digital computing device, digital communication data representing a first digital conversation comprising online community posts of two or more digital accounts;
   receiving, at the digital computing device, from a first computing device associated with a first digital account of one or more digital accounts, a request to generate a digital communication group;
   determining, by the digital computing device, a first subset of the two or more digital accounts to associate with the digital communication group based on the online community posts;
   creating and storing the digital communication group in association with a name of the digital communication group and account identifiers of each of the digital accounts in the first sub set;
   providing, by the digital computing device, access to the digital communication group to a particular digital accounts in the first subset of the one or more digital accounts.

12. The non-transitory computer-readable media of claim 11, wherein the first digital conversation is a digital messaging board and the association between the one or more digital accounts and the first digital conversation comprises at least one interaction by each of the one or more digital accounts with the digital messaging board.

13. The non-transitory computer-readable media of claim 11, further comprising instructions which, when executed by the one or more processors, cause:
   receiving, by the digital computing device, data indicating an interaction between a second digital account and the first digital conversation;

associating, by the digital computing device, the second digital account with the first digital conversation;

determining, by the digital computing device, whether the second digital account will be included in the first subset of the one or more digital accounts.

14. The non-transitory computer-readable media of claim 11, further comprising instructions which, when executed by the one or more processors, cause:

sending, to the first computing device associated with the first digital account, a list comprising the one or more digital accounts associated with the first digital conversation;

selecting, at the first computing device associated with the first digital account, a subset of the one or more digital accounts from the list;

wherein the first subset of the one or more digital accounts to associate with the digital communication group is based on the selected subset of the one or more digital accounts from the list.

15. The non-transitory computer-readable media of claim 11, wherein the digital communication group is an access-restricted web page, a second digital conversation is a digital messaging board, and providing access to the digital communication group and the second digital conversation, to one or more account devices associated with each digital account in the first subset of the one or more digital accounts comprises granting access to the one or more account devices to view the access-restricted web page and interact with the digital messaging board.

16. The non-transitory computer-readable media of claim 11, further comprising instructions which, when executed by the one or more processors, cause:

determining, by the digital computing device, a second subset of the one or more digital accounts, the second subset containing one or more digital accounts which have interacted with the first digital account over the first digital conversation;

wherein the first subset of the one or more digital accounts to associate with the digital communication group is based on the second subset of the one or more digital accounts.

17. The non-transitory computer-readable media of claim 11, wherein:

each digital account of the one or more digital accounts is associated with a geographic area;

the non-transitory computer-readable media further comprises instructions which, when executed by the one or more processors, cause determining, by the digital computing device, a geographic subset of the one or more digital accounts, the geographic subset comprising digital accounts associated with a geographic area within a threshold boundary centered on a first geographic area associated with the first digital account;

the first subset of the one or more digital accounts to associate with the digital communication group is based on the geographic subset of the one or more digital accounts.

18. The non-transitory computer-readable media of claim 11, wherein:

the association between the one or more digital accounts and the first digital conversation comprises a visual representation of one or more digital accounts' interactions with the first digital conversation;

the non-transitory computer-readable media further comprises instructions which, when executed by the one or more processors, cause selecting, by the first computing device associated with the first digital account, through the visual representation, a second digital account to include in the digital communication group;

the first subset of the one or more digital accounts to associate with the digital communication group comprises at least the first and second digital accounts.

19. The non-transitory computer-readable media of claim 11, wherein:

the association between the one or more digital accounts and the first digital conversation comprises one or more digital accounts' interactions with the first digital conversation;

the non-transitory computer-readable media further comprises instructions which, when executed by the one or more processors, cause determining a second subset of digital accounts of the one or more digital accounts which interacted with the first digital conversation in a first manner;

the method further comprises determining a third subset of digital accounts of the one or more digital accounts which interacted with the first digital conversation in a second manner;

the first subset of the one or more digital accounts to associate with the digital communication group comprises the second subset of the one or more digital accounts and does not comprise the third subset of the one or more digital accounts.

20. The non-transitory computer-readable media of claim 11, wherein providing, by the digital computing device, access to the digital communication group, to the particular digital accounts in the first subset of the one or more digital accounts, comprises providing access to the digital communication group only to the particular digital accounts in the first subset of the one or more digital accounts and no other digital accounts.

* * * * *